US008204468B2

(12) United States Patent
Chang et al.

(10) Patent No.: US 8,204,468 B2
(45) Date of Patent: Jun. 19, 2012

(54) CONSTANT OUTPUT DC BIAS CIRCUIT USING AN OPEN LOOP SCHEME

(75) Inventors: Yuyu Chang, Irvine, CA (US); Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 384 days.

(21) Appl. No.: 12/496,325

(22) Filed: Jul. 1, 2009

(65) Prior Publication Data

US 2011/0003574 A1 Jan. 6, 2011

(51) Int. Cl.
*H04B 1/26* (2006.01)

(52) U.S. Cl. ......................... 455/323; 330/261; 330/296

(58) Field of Classification Search .................. 455/323; 330/261, 296; 398/32
See application file for complete search history.

(56) References Cited

U.S. PATENT DOCUMENTS 5,229,664 A * 7/1993 Brehmer ....................... 327/553
2010/0156536 A1* 6/2010 Lee et al. ...................... 330/261

* cited by examiner

*Primary Examiner* — Christian Hannon
(74) *Attorney, Agent, or Firm* — Sterne, Kessler, Goldstein & Fox P.L.L.C.

(57) ABSTRACT

Embodiments of the present invention provide DC biasing circuits. Embodiments employ an open loop scheme, instead of a closed loop scheme as used in conventional circuits. In addition, embodiments generate a DC bias voltage that is independent of temperature, process, and power supply variations. Further, embodiments require low amounts of power and silicon.

19 Claims, 5 Drawing Sheets

200

400

CONSTANT OUTPUT DC BIAS CIRCUIT USING AN OPEN LOOP SCHEME

BACKGROUND

1. Field of the Invention

The present invention relates generally to constant output DC biasing.

2. Background Art

Constant output DC bias circuits are used in a variety of applications to provide constant DC bias that is independent of temperature and process variations.

Conventional constant output DC bias circuits are based on a closed loop feedback scheme. Thus, maintaining closed loop stabilization is required. In addition, the conventional feedback loop is difficult to stabilize when there are multiple high impedance nodes in the feedback path.

Accordingly, there is a need for improved constant output DC bias circuits.

BRIEF SUMMARY

The present invention relates generally to constant output DC biasing.

Embodiments of the present invention provide constant output DC biasing circuits that employ an open loop scheme, instead of a closed loop scheme as used in conventional circuits. As a result, the need for circuit stabilization is eliminated. In addition, embodiments generate a DC bias voltage that is independent of temperature, process, and power supply variations. Further, embodiments require low amounts of power and silicon area.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
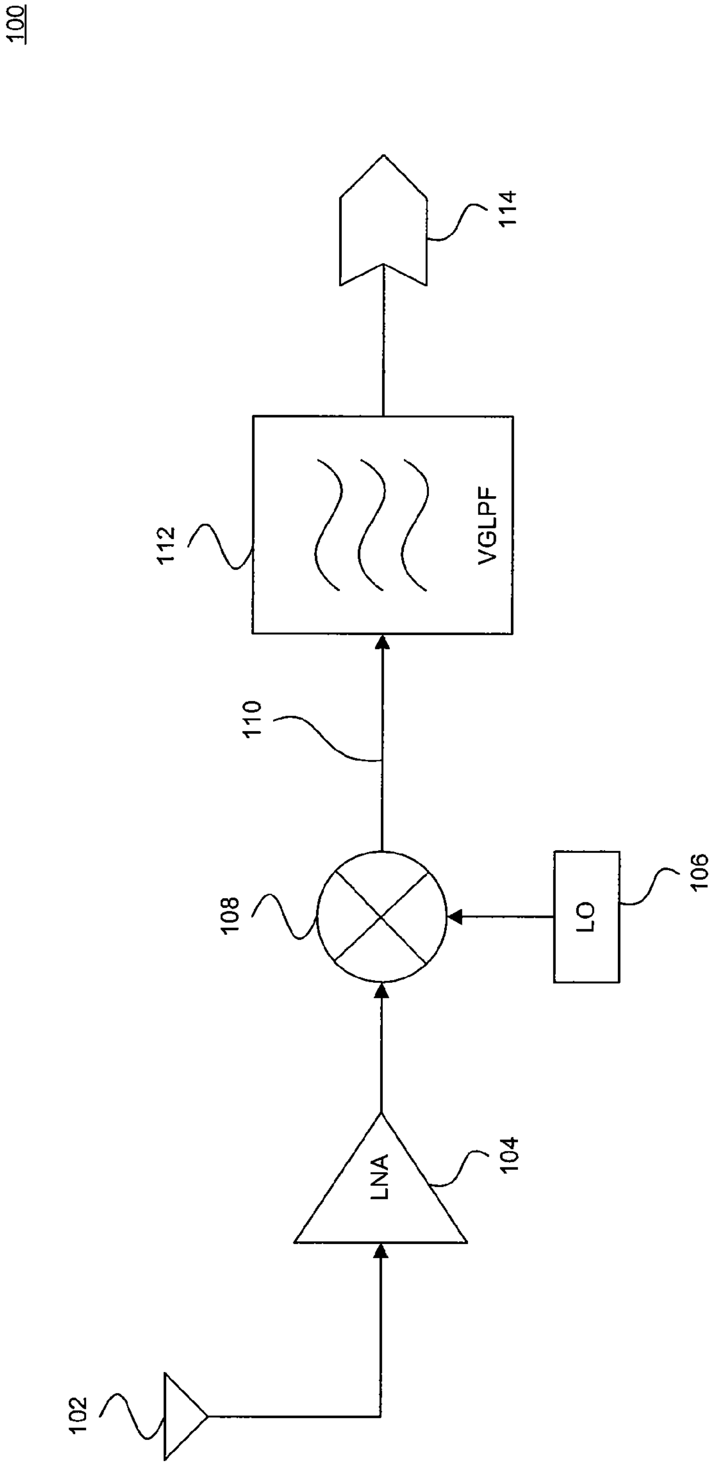
FIG. 1 illustrates an example receiver communication chain.

FIG. 1 illustrates an example receiver communication chain 100. As shown in FIG. 1, example communication chain 100 includes an antenna 102, a low-noise amplifier (LNA) 104, a local oscillator (LO) 106, a mixer 108, a variable gain low pass filter (VGLPF) 112, and an I/Q Analog-to-Digital Converter (ADC) 114.

Typically, a constant DC bias voltage is necessary at node 110 of example communication chain 100 in order to ensure that subsequent blocks of the communication chain operate at their expected DC operating points, without signal saturation or clipping. This means that the DC bias voltage at node 110 must be independent of process, temperature, and power supply variations. Furthermore, it is generally desirable to avoid large on-chip decoupling capacitors in low frequency analog circuits. Thus, generally the voltage at node 110 is input directly into VGLPF 112 from mixer 110 without a DC decoupling capacitor.

Figure 2:
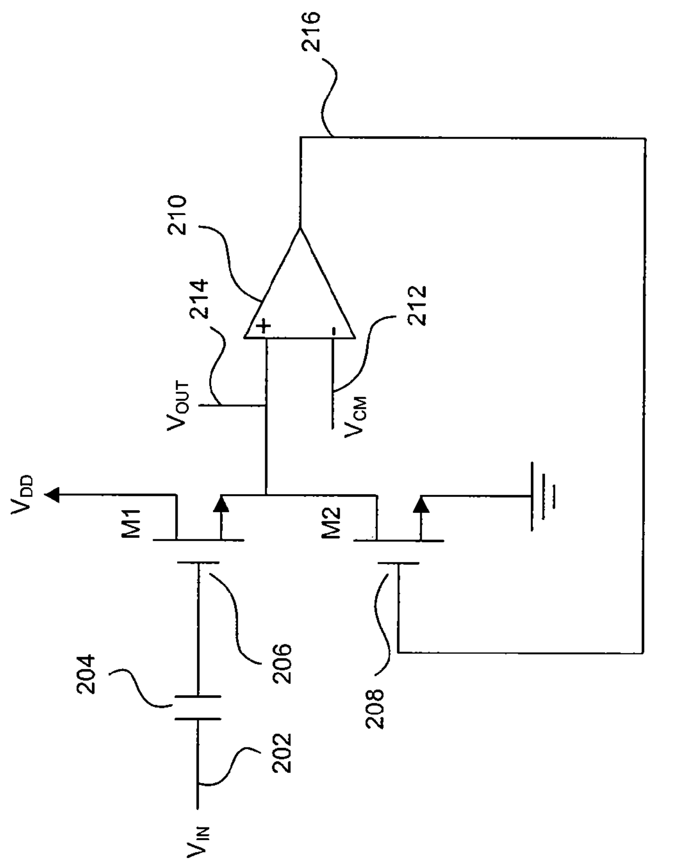
FIG. 2 illustrates a conventional constant output DC bias circuit.

FIG. 2 illustrates a conventional constant output DC bias circuit 200. Circuit 200 can be used, for example, as an interface between mixer 108 and VGLPF 112, to provide constant output DC bias to VGLPF 112. As such, the output of mixer 108 would be coupled to input terminal 202 of circuit 200, and output terminal 214 of circuit 200 would be coupled to the input of VGLPF 112.

As shown in FIG. 2, circuit 200 includes a coupling capacitor 204, a first transistor M1 206, a second transistor M2 208, and an operational amplifier 210.

Transistor M1 206 has its gate terminal coupled to input terminal 202 via capacitor 204, its drain terminal coupled to a supply voltage $V_{dd}$, and its source terminal coupled to the drain terminal of transistor M2 208. Transistor M2 208 has its drain terminal coupled to the source terminal of transistor M1 206, its source terminal coupled to ground, and its gate terminal coupled to the output 216 of operational amplifier 210.

Operational amplifier 210 has its non-inverting input coupled to the common source-drain terminal of transistors M1 206 and M2 208, and its inverting input coupled to a constant voltage input $V_{cm}$ 212. The output 216 of operational amplifier 210 is coupled to the gate terminal of transistor M2 208, thus forming a closed feedback loop.

Generally, $V_{cm}$ 212 is independent of temperature and process variations and is generated from a bandgap reference voltage. In addition, operational amplifier 210 has a very high gain, such that the voltage difference between its non-inverting and inverting inputs is negligible compared to other voltages in the circuits. In other words, operational amplifier 210 forces $V_{out}$ 214 to follow $V_{cm}$ 212 which is independent of temperature and process variations.

While circuit 200 is generally simple to design, it does have drawbacks. One major drawback relates to the need to meet the closed loop stability requirement due to the use of a feedback loop. In addition, for certain processes, the gate-to-source voltage ($V_{gs}$) of transistors M1 206 and M2 208 is very small, which leads to significant gain attenuation of the input signal 202.

Accordingly, there is a need for improved constant output DC bias circuits. Embodiments of the present invention as will be described below employ an open loop scheme, instead of a closed loop scheme as in conventional circuits. As a result, the need for circuit stabilization is eliminated. In addition, embodiments provide a DC bias voltage that is independent of temperature, process, and power supply variations. Further, embodiments require low amounts of power and silicon area.

Figure 3:
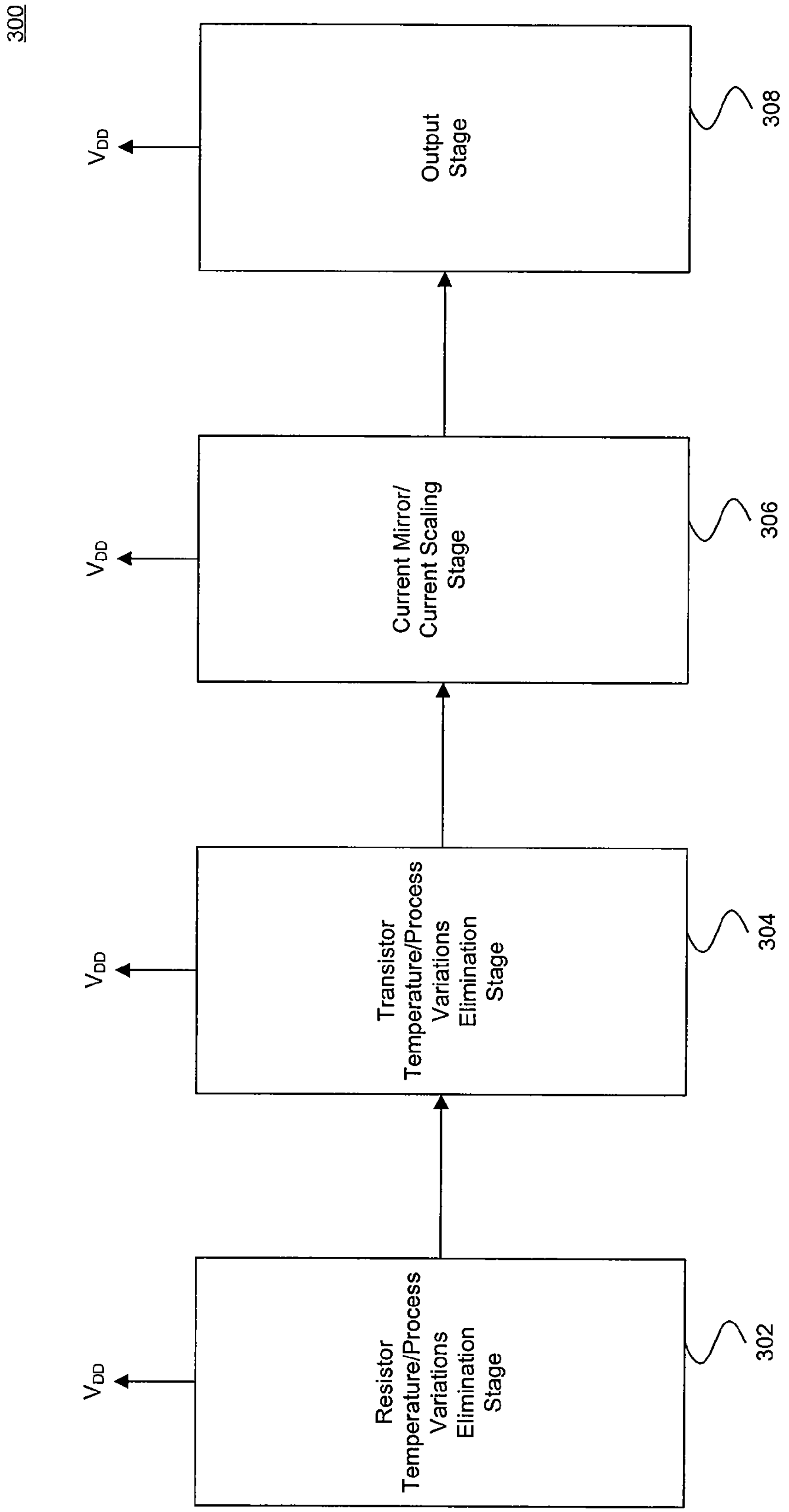
FIG. 3 is a block diagram of an example constant output DC bias circuit according to an embodiment of the present invention.

FIG. 3 is a block diagram of an example constant output DC bias circuit 300 according to an embodiment of the present invention. As shown in FIG. 3, example circuit 300 includes a resistor temperature/process variations elimination stage 302, a transistor temperature/process variations elimination stage 304, a current mirror and/or current scaling stage 306, and an output stage 308. As would be understood by a person skilled in the art based on the teachings herein, while stages 302, 304, 306, and 308 are shown as separate in FIG. 3, in implementation they may have less defined boundaries and may share common circuit elements.

As will be described further below, stages 302, 304, and 306 form a biasing circuit that enables output stage 308 to generate a desired constant output DC voltage. This is done by matching stages 302 and 304 to output stage 308 such that temperature/process variations, which may be due to various components of output stage 308, are eliminated. For example, stage 302 reduces or eliminates temperature/process variations in the output DC voltage of output stage 308 that are due to temperature/process variations in resistor components of output stage 308. Similarly, stage 304 reduces or eliminates temperature/process variations in the output DC voltage of output stage 308 that are due to temperature/process variations in transistor components of output stage 308. In addition, stage 306 is configured according to output stage 308 such that a desired value of the constant output DC voltage is achieved. Further, by using a common supply voltage ($V_{dd}$) to drive each of the stages 302, 304, 306, and 308, variations in the output DC voltage of output stage 308 that are due to power supply variations can be eliminated.

In the foregoing, an example constant output DC bias circuit according to embodiments of the present invention will be provided. This example is provided for the purpose of illustration only and is not limiting of the scope of embodiments of the present invention.

For the purpose of illustration, the output stage of the example constant output DC bias circuit will be described first with reference to FIG. 4. Then, the complete circuit topology of the constant output DC bias circuit, including the biasing circuit which enables the output stage to generate a desired constant output DC voltage, will be described with reference to FIG. 5.

Figure 4:
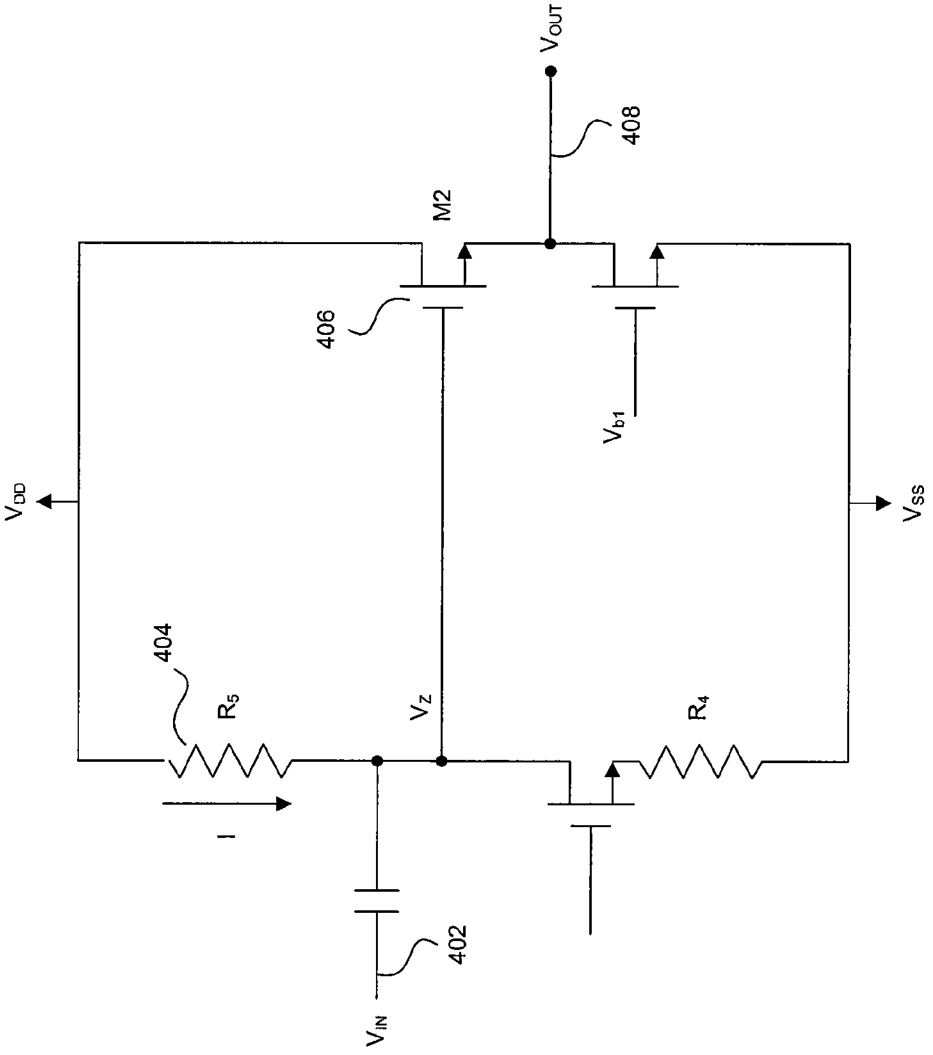
FIG. 4 illustrates an example output stage of a constant output DC bias circuit according to an embodiment of the present invention.

FIG. 4 illustrates an example output stage 400 of a constant output DC bias circuit according to an embodiment of the present invention. Output stage 400 provides an input terminal 402 and an output terminal 408 for the constant output DC bias circuit. Thus, for example, if the constant output DC bias circuit is used as an interface between mixer 108 and VGLPF 112 of FIG. 1, then the output of mixer 108 would be coupled to input terminal 402, and output terminal 408 would be coupled to the input of VGLPF 112.

Output terminal 408 provides the output of the constant output DC bias circuit. Thus, $V_{out}$ 408 is a constant output DC voltage, independent of temperature, process, and power supply variations. Notice that mathematically $V_{out}$ 408 is equal to $V_{dd}-I*R_5-V_{gs\_2}$, where $V_{dd}$ is the power supply voltage, $I*R_5$ is the voltage drop caused by a current I across resistor $R_5$ 404, and $V_{gs\_2}$ is the gate-to-source voltage of transistor M2 406. Therefore, to force $V_{out}$ 408 to have a constant value $V_C$, the current I flowing through $R_5$ 404 must be equal to $(V_{dd}-V_C-V_{gs\_2})/R_5$, which effectively eliminates the temperature/process variations due to the power supply voltage $V_{dd}$, resistor $R_5$ 404, and transistor $M_2$ 406 of output stage 400, as will be shown below.

Figure 5:
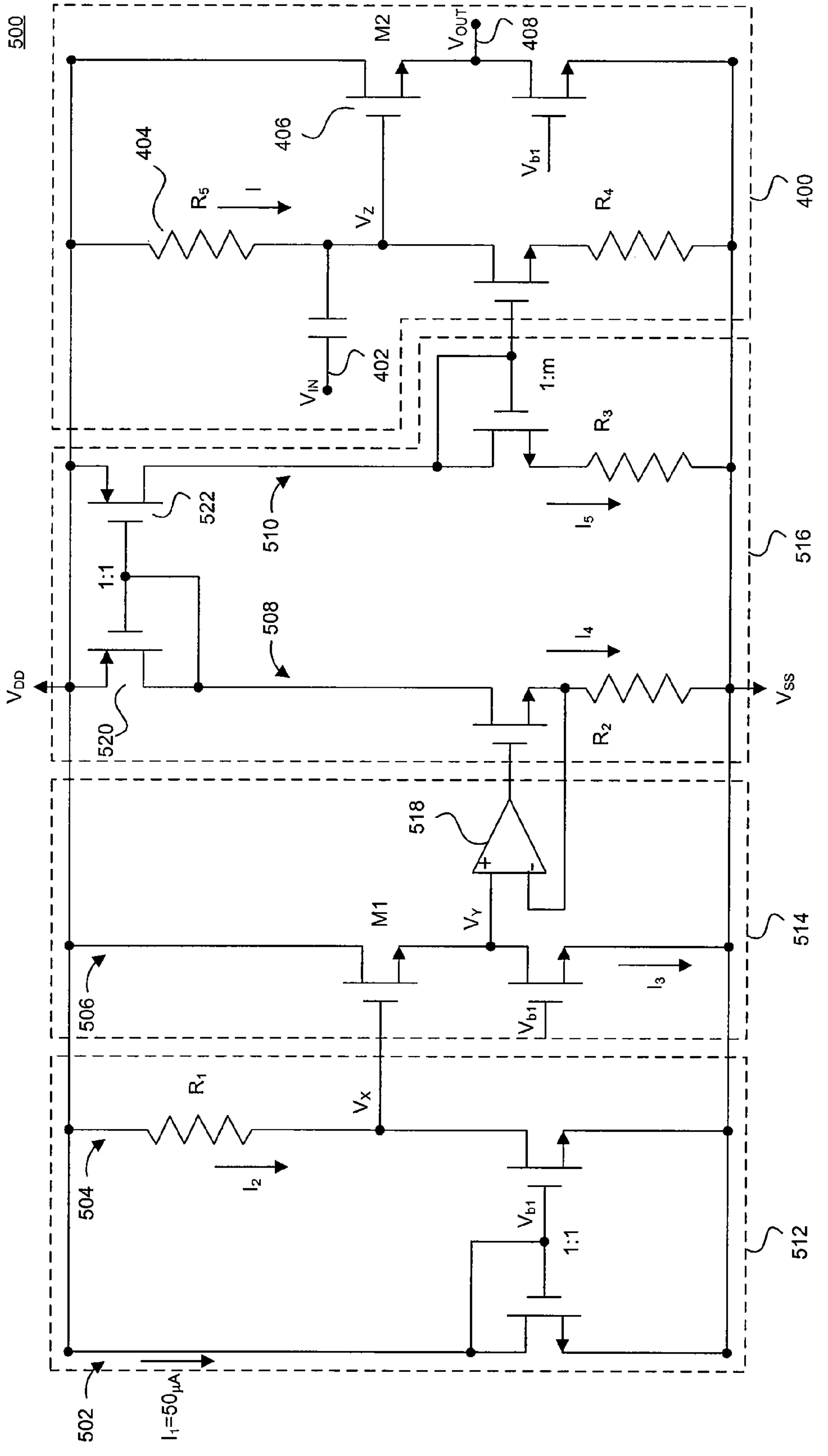
FIG. 5 illustrates an example constant output DC bias circuit according to an embodiment of the present invention.

FIG. 5 illustrates an example constant output DC bias circuit 500 according to an embodiment of the present invention. It is noted that example bias circuit 500 includes output stage circuit 400 described above, in addition to a biasing circuit coupled to output stage circuit 400. The biasing circuit enables output stage circuit 400 to generate a constant DC voltage. The biasing circuit, as described above in FIG. 3, can be viewed as including multiple stages 512, 514, and 516, each designed to eliminate one factor that causes variations in the output DC voltage $V_{out}$ 408 of output stage circuit 400. For example, in an embodiments, stages 512, 514, and 516 correspond respectively to stages 302, 304, and 306 shown in FIG. 3.

As noted above with reference to FIG. 4, in order to generate an output voltage $V_{out}$ 408 of constant value $V_C$, the current I flowing through resistor $R_5$ 404 of output stage 400 must be equal to $(V_{dd}-V_C-V_{gs})/R_5$. In bias circuit 500 of FIG. 5, this is achieved as described below.

First, it is noted that $V_{out}$ 408 is equal to the voltage $V_Z$ (at the node shown in FIG. 5) minus the voltage $V_{gs\_2}$, where $V_{gs\_2}$ is the gate-to-source voltage of transistor M2 406. Accordingly, the voltage $V_{out}$ 408 can be written as:

$$V_{out}=V_Z-V_{gs\_2}=V_{dd}-I*R_5-V_{gs\_2}. \tag{1}$$

Stage 516 of bias circuit 500 operates as a current mirroring/scaling stage. As such, stage 516 first mirrors current $I_4$ of branch 508 into current $I_5$ of branch 510 (using the current mirror formed by transistors 520 and 522 and which couples branches 508 and 510), before scaling current $I_5$ by a factor m (using the current mirror that couples stage 516 and output stage 400). Accordingly, the current I that flows through resistor $R_5$ of output stage 400 can be written as:

$$I=m*I_5=m*I_4. \tag{2}$$

Equation (1) above can thus be re-written as:

$$V_{out}=V_{dd}-m*I_4*R_5-V_{gs\_2}. \tag{3}$$

As can be noted from FIG. 5, current $I_4$ is equal to the voltage across resistor $R_2$ divided by the value of resistor $R_2$. Further, because operational amplifier 518 of stage 514 has a very high gain which forces its non-inverting input voltage $V_Y$ and its inverting input voltage to be equal, the voltage across $R_2$ is equal to the voltage $V_Y$ at the non-inverting input of operational amplifier 518. Accordingly, equation (3) above can be re-written as:

$$V_{out}=V_{dd}-m*(V_Y/R_2)*R_5-V_{gs\_2}. \tag{4}$$

It can also be noted from FIG. 5 that the voltage $V_Y$ at the non-inverting input of operational amplifier 518 is equal to $V_{dd}-I_2*R_1-V_{gs\_1}$, where $I_2$ is the current flowing through branch 504 and resistor $R_1$ of stage 512, and $V_{gs\_1}$ is the gate-to-source voltage of transistor M1 of stage 514. Further, current $I_2$ is a mirror current of $I_1$ which flows in branch 502 of stage 512. In an embodiment, current $I_1$ is generated using a constant bandgap voltage $V_{BG}$ (not shown in FIG. 5) across a resistor R (not shown in FIG. 5). In an embodiment, current $I_1$ has a value of 50 μA. Accordingly, equation (4) above can be re-written as:

$$V_{out}=V_{dd}-m*(V_{dd}-I_2*R_1-V_{gs\_1})*(R_5/R_2)-V_{gs\_2}; \tag{5}$$

$$=V_{dd}-m*(V_{dd}-V_{BG}*(R_1/R)-V_{gs\_1})*(R_5/R_2)-V_{gs\_2}. \tag{6}$$

Is noted that with appropriate configuration of the values of resistors $R_2$ and $R_5$ and of the factor m, the dependency of $V_{out}$ on the power supply voltage $V_{dd}$ can be reduced or eliminated. In particular, the dependency on $V_{dd}$ can be eliminated in equation (6) above by setting the term $m*(R_5/R_2)=1$, or $m*R_5=R_2$. Thus, stage 516 acts to reduce or eliminate $V_{dd}$ variations that may affect $V_{out}$ 408.

In addition, variations of $V_{out}$ 408 due to temperature/process variations in transistor $M_2$ 406 of output stage 400 (in particular, variations in Vgs_2) can be reduced or eliminated by further ensuring that $V_{gs\_2}$ is equal to $V_{gs\_1}$. In an embodiment, this is achieved by biasing transistor M1 and M2 at the same current density. Moreover, M1 and M2 may have their substrates tied to their source terminals to eliminate the body effect. It is noted that by providing the voltage drop across transistor M1, stage 514 acts to reduce or eliminate transistor temperature/process variations that may affect $V_{out}$ 408.

With configuration of resistors $R_2$ and $R_5$, the factor m, and transistors M1 and M2 as described above, equation (6) above reduces to:

$$V_{out}=V_{BG}*(R_1/R)=I_1*R_1. \quad (7)$$

Notice that $V_{out}$ accordingly is not affected by temperature/process variations of resistor components of bias circuit 500 (assuming $R_1$ and R are made of same material and experience same temperature/process variations). Thus, by providing the voltage drop across resistor $R_1$, stage 512 acts to eliminate resistor temperature/process variations that may affect $V_{out}$ 408.

From equation (7), it can further be noted that the value of $V_{out}$ depends directly and solely on the value of resistor $R_1$, given that current $I_1$ is provided to bias circuit 500 as a current based on a bandgap voltage and is inversely proportional to the resistor R. Thus, $V_{out}$ can be adjusted readily by varying the value of resistor $R_1$.

As can be seen from FIG. 5, example bias circuit 500 is an open loop DC bias circuit. As such, stabilization concerns of closed loop schemes are eliminated.

As noted above, bias circuit 500 is provided solely for the purpose of illustration of embodiments according to the present invention and is not limited of the scope of embodiments of the present invention. Further, as would be understood by a person skilled in the art based on the teachings herein, embodiments of the present invention extend beyond the circuit topology provided in FIG. 5 and encompass other circuit variations which would be apparent to a person of skill in the art.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A DC bias circuit, comprising:
an output stage that generates a DC voltage output;
a first stage that reduces variations in the DC voltage output that are due to temperature/process variations in a resistor of the output stage; and
a second stage that reduces variations in the DC voltage output that are due to temperature/process variations in a transistor of the output stage.

2. The bias circuit of claim 1, wherein the output stage, the first stage, and the second stage use a common power supply, thereby reducing variations in the DC voltage output that are due to temperature/process variations in the power supply.

3. The bias circuit of claim 1, wherein the first stage comprises a resistor matched to said resistor of the output stage.

4. The bias circuit of claim 3, wherein the resistor of the first stage is made of same material and experiences same temperature/process variations as the resistor of the output stage.

5. The bias circuit of claim 3, wherein a value of the DC voltage output is varied by adjusting said resistor of the first stage.

6. The bias circuit of claim 1, wherein the second stage comprises a transistor matched to said transistor of the output stage.

7. The bias circuit of claim 6, wherein the transistor of the second stage is biased at a same current density as said transistor of the output stage.

8. The bias circuit of claim 7, wherein the transistor of the second stage and the transistor of the output stage have their respective substrates tied to their respective source terminals to reduce the body effect.

9. The bias circuit of claim 1, further comprising:
a current mirroring/scaling stage that enables the output stage to generate the DC voltage output at a desired value.

10. The bias circuit of claim 1, further comprising:
a current mirroring/scaling stage that reduces variations in the DC voltage output that are due to temperature/process variations in a power supply of the output stage.

11. The bias circuit of claim 10, wherein the current mirroring/scaling stage configures a current scaling factor to eliminate the dependency of the DC voltage output on the power supply.

12. The bias circuit of claim 1, wherein the generated DC voltage output is independent of temperature, process, and power supply variations.

13. A receiver, comprising:
a mixer;
a low-pass filter coupled to said mixer; and
a DC bias circuit coupled between said mixer and said low-pass filter, wherein said DC bias circuit provides a DC voltage output to said low-pass filter, the DC bias circuit comprising:
an output stage that generates the DC voltage output;
a first stage that reduces variations in the DC voltage output that are due to temperature/process variations in a resistor of the output stage; and
a second stage that reduces variations in the DC voltage output that are due to temperature/process variations in a transistor of the output stage.

14. The receiver of claim 13, wherein the output stage, the first stage, and the second stage use a common power supply, thereby reducing variations in the DC voltage output that are due to temperature/process variations in the power supply.

15. The receiver of claim 13, wherein the first stage comprises a resistor matched to said resistor of the output stage.

16. The receiver of claim 13, wherein the second stage comprises a transistor matched to said transistor of the output stage.

17. The receiver of claim 13, wherein the bias circuit further comprises:

a current mirroring/scaling stage that reduces variations in the DC voltage output that are due to temperature/process variations in a power supply of the output stage.

18. The receiver of claim 13, wherein the bias circuit employs an open loop scheme.

19. The receiver of claim 13, wherein the bias circuit enables the low-pass filter to operate at a fixed bias operating point, independent of temperature, process, and power supply variations.

* * * * *